(12) United States Patent
Sugiura et al.

(10) Patent No.: US 11,112,026 B2
(45) Date of Patent: Sep. 7, 2021

(54) FLUID DEVICE

(71) Applicant: TAKASAGO ELECTRIC, INC., Nagoya (JP)

(72) Inventors: Hiroyuki Sugiura, Nagoya (JP); Yutaka Hayashi, Nagoya (JP); Ken Naito, Nagoya (JP); Masaaki Inoue, Nagoya (JP)

(73) Assignee: TAKASAGO ELECTRIC, INC., Nagoya (JP)

( * ) Notice: Subject to any disclaimer, the term of this patent is extended or adjusted under 35 U.S.C. 154(b) by 0 days.

(21) Appl. No.: 16/625,855

(22) PCT Filed: Nov. 6, 2018

(86) PCT No.: PCT/JP2018/041191
§ 371 (c)(1),
(2) Date: Dec. 23, 2019

(87) PCT Pub. No.: WO2019/093329
PCT Pub. Date: May 16, 2019

(65) Prior Publication Data
US 2020/0132211 A1 Apr. 30, 2020

(30) Foreign Application Priority Data
Nov. 7, 2017 (JP) .............................. JP2017-215050

(51) Int. Cl.
*G01F 1/64* (2006.01)
*F16K 37/00* (2006.01)
(Continued)

(52) U.S. Cl.
CPC ...... *F16K 31/0675* (2013.01); *F16K 31/0613* (2013.01); *G01F 1/56* (2013.01);
(Continued)

(58) Field of Classification Search
CPC .. F16K 11/044; F16K 27/029; F16K 31/0613; F16K 31/0655; F16K 31/0675;
(Continued)

(56) References Cited

U.S. PATENT DOCUMENTS 9,901,068 B2 * 2/2018 Fematt .................... F16K 51/02
9,993,821 B2 * 6/2018 Sugiura ............... F16K 31/0627
2016/0377193 A1 12/2016 Scherer et al.

FOREIGN PATENT DOCUMENTS

JP 2000-300099 A 10/2000
JP 2013-117241 A 6/2013
(Continued)

OTHER PUBLICATIONS

Dec. 4, 2018 International Search Report issued in International Patent Application No. PCT/JP2018/041191.

*Primary Examiner* — Matthew W Jellett
(74) *Attorney, Agent, or Firm* — Oliff PLC

(57) ABSTRACT

An electromagnetic valve as a fluid device is provided with a valve seat and a valve body midway of a flow path where a liquid flows, and closes the valve with the valve body pressed onto the valve seat and opens the valve by causing a gap between the valve seat and the valve body. The electromagnetic valve includes, as electrodes for measuring a degree of electrical conductivity between a liquid on an upstream side and a liquid on a downstream side of the valve seat and the valve body in the flow path, a first electrode electrically conductive to the liquid on the upstream side and a second electrode electrically conductive to the liquid on the downstream side. By using the first and second electrodes, detection of liquid leakage can be easily performed.

13 Claims, 15 Drawing Sheets

(51) Int. Cl.
  *F16K 31/06* (2006.01)
  *G01F 1/56* (2006.01)
  *G01F 1/60* (2006.01)
  *G01F 1/58* (2006.01)
  *B60T 8/36* (2006.01)
  *F16K 11/044* (2006.01)
  *F16K 27/02* (2006.01)

(52) U.S. Cl.
  CPC .............. *G01F 1/584* (2013.01); *G01F 1/588* (2013.01); *G01F 1/60* (2013.01); *G01F 1/64* (2013.01); *B60T 8/363* (2013.01); *F16K 11/044* (2013.01); *F16K 27/029* (2013.01); *F16K 37/0041* (2013.01); *Y10T 137/2529* (2015.04); *Y10T 137/7761* (2015.04)

(58) Field of Classification Search
  CPC .............. F16K 37/0041; F16K 37/005; F16K 37/0091; G01F 1/00; G01F 1/56; G01F 1/584; G01F 1/588; G01F 1/60; G01F 1/64; Y10T 137/2529; Y10T 137/7761
  See application file for complete search history.

(56) References Cited

FOREIGN PATENT DOCUMENTS

| | | | |
|---|---|---|---|
| JP | 2014-31861 A | | 2/2014 |
| JP | 2014031861 A | * | 2/2014 |
| JP | 2016-75300 A | | 5/2016 |

\* cited by examiner

[FIG. 1]
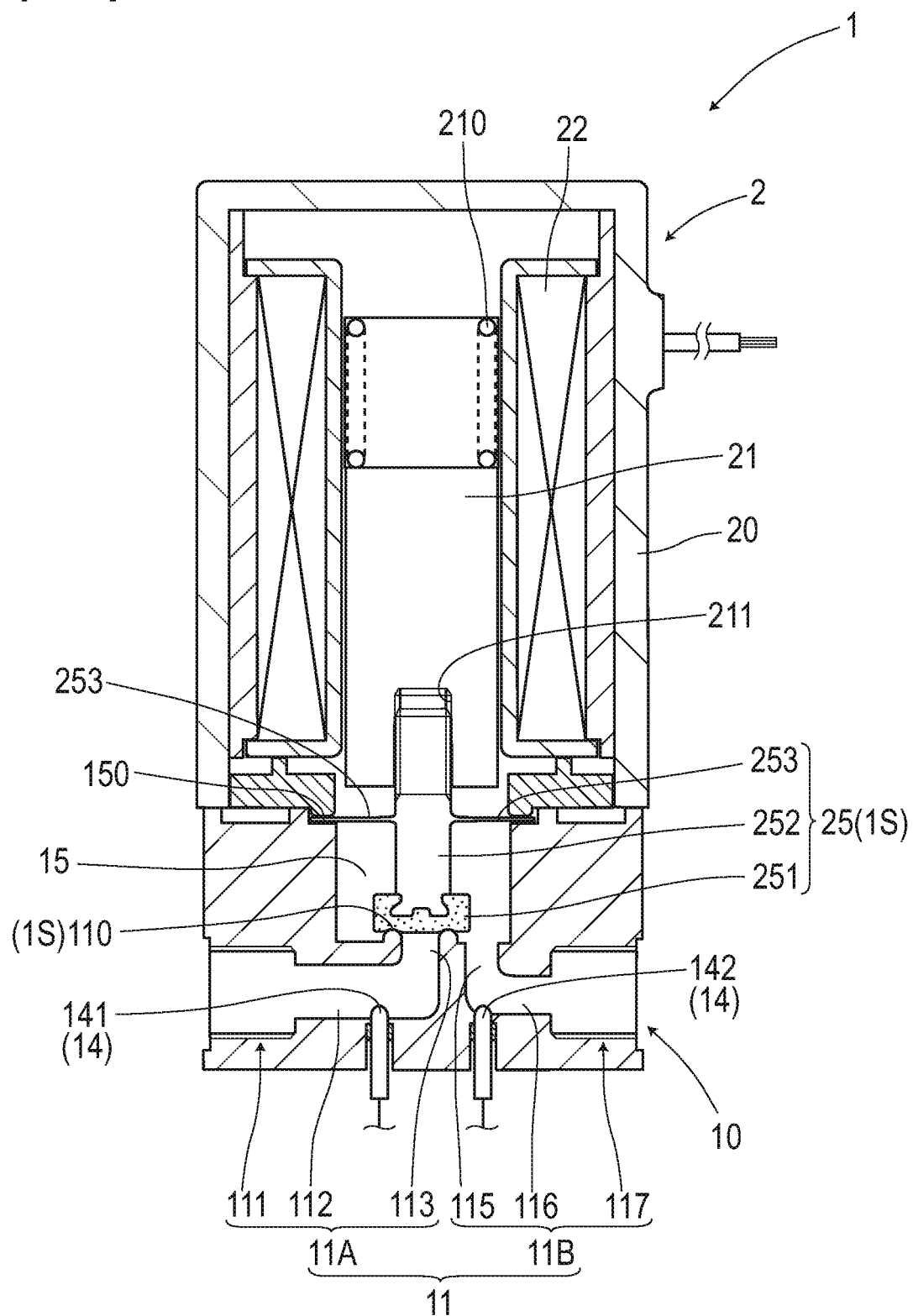

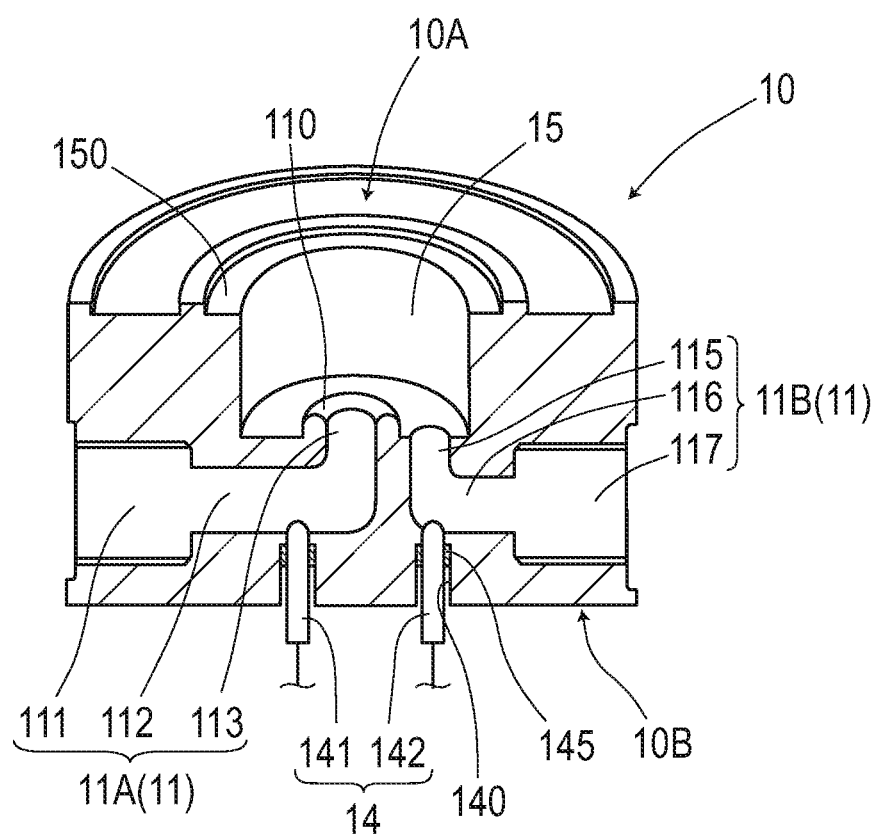
[FIG. 2]

[FIG. 3]
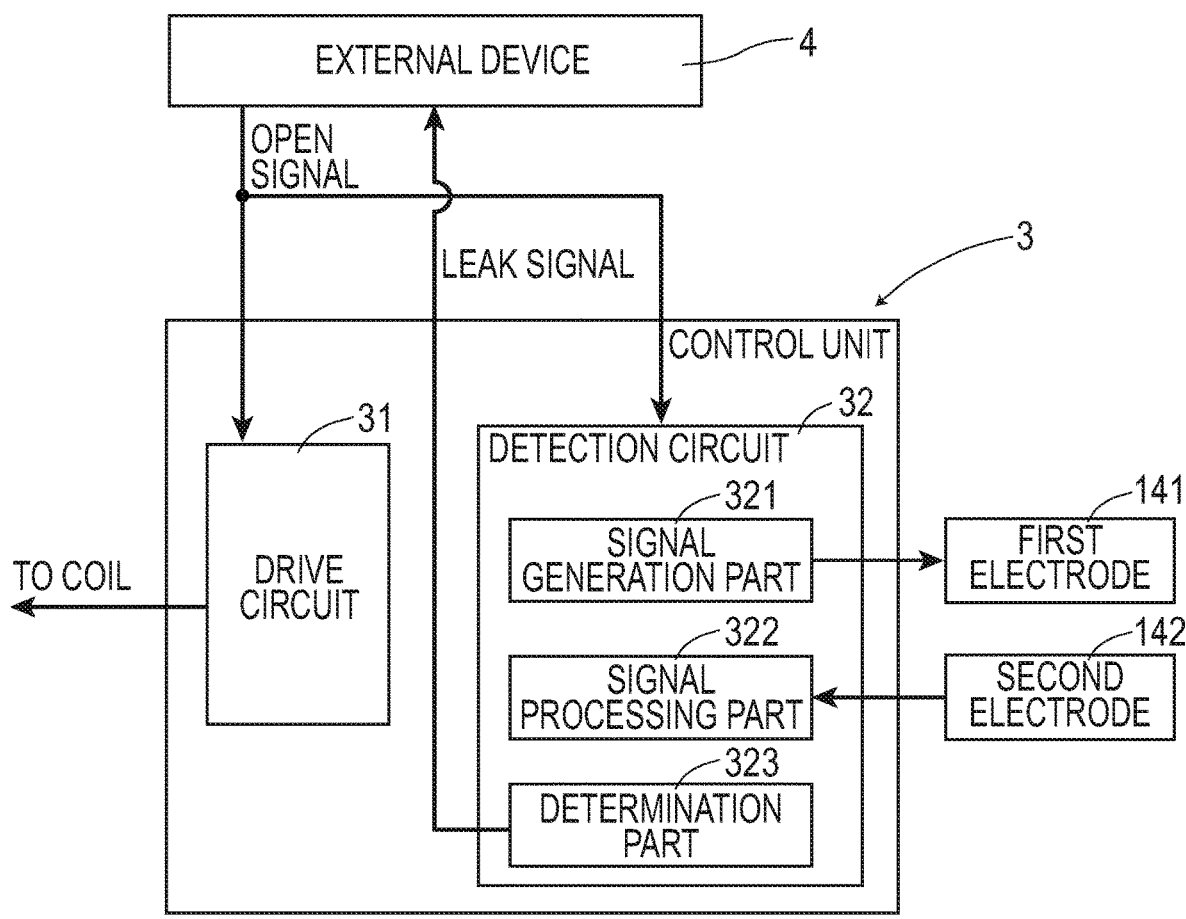

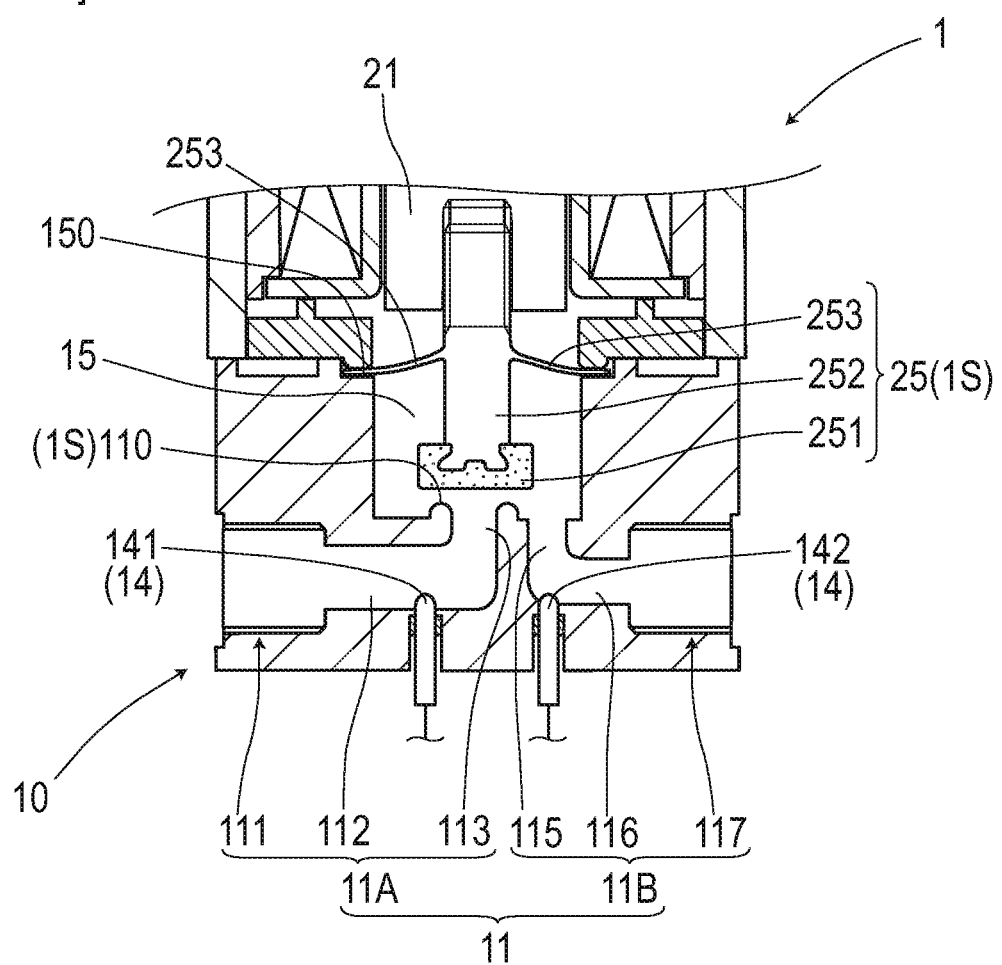
[FIG. 4]

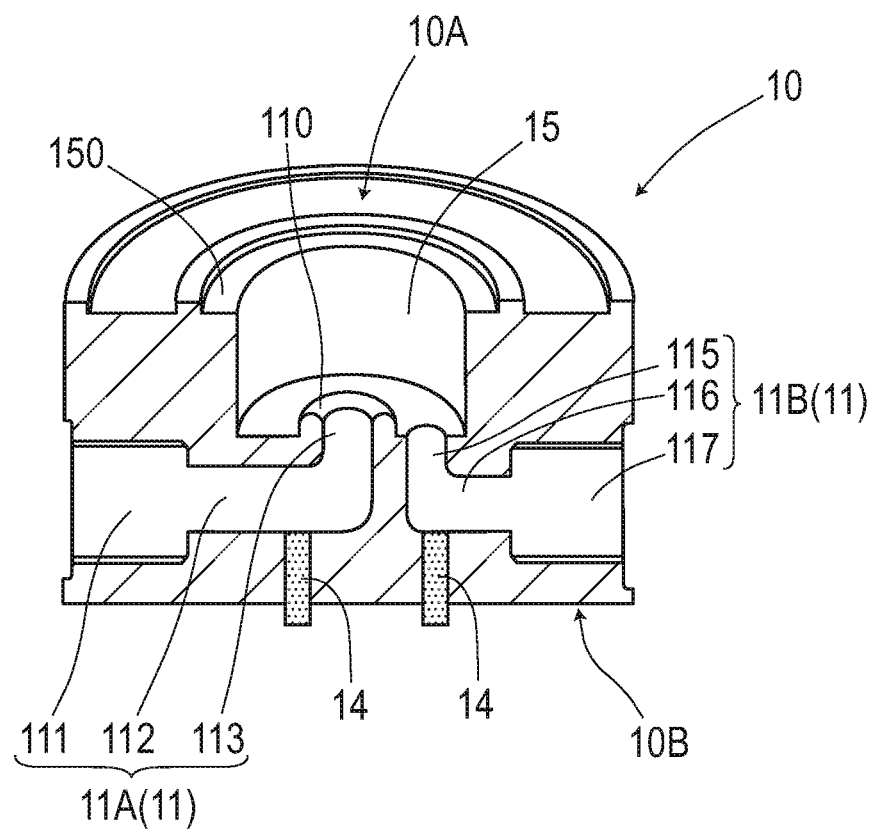
[FIG. 5]

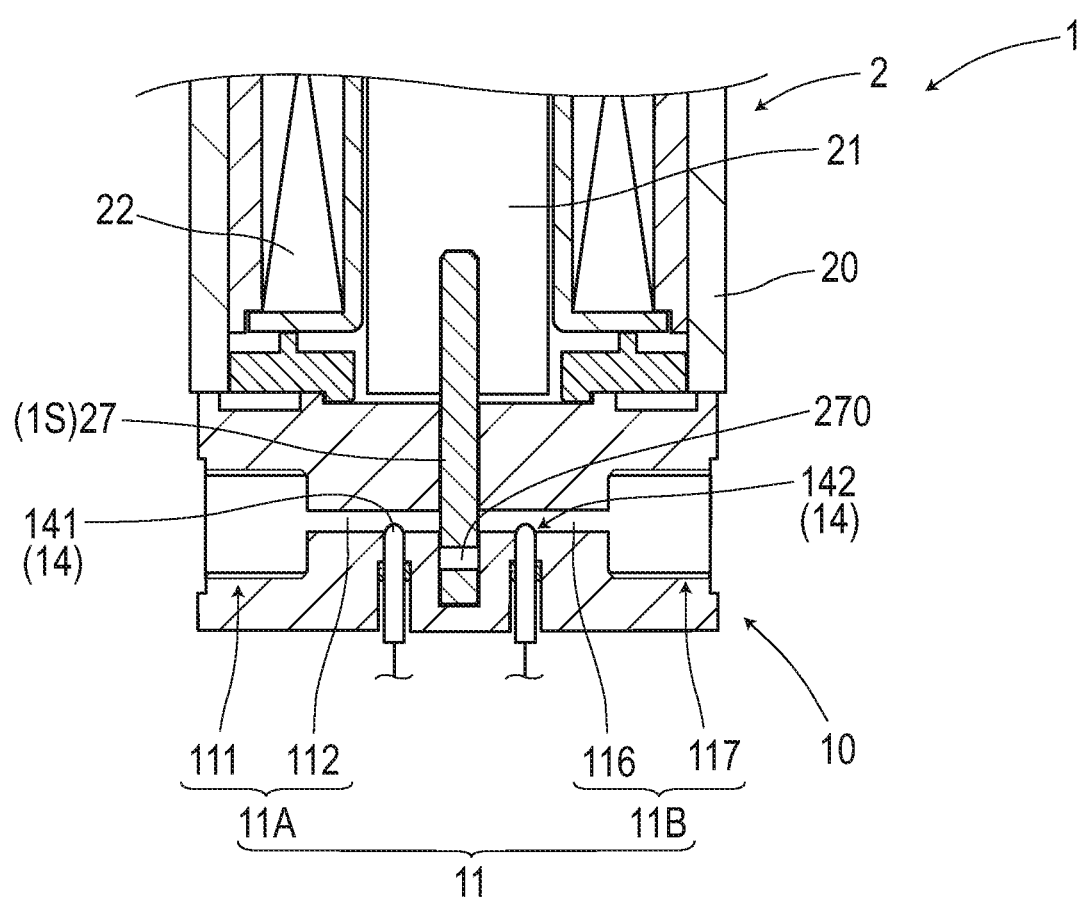
[FIG. 6]

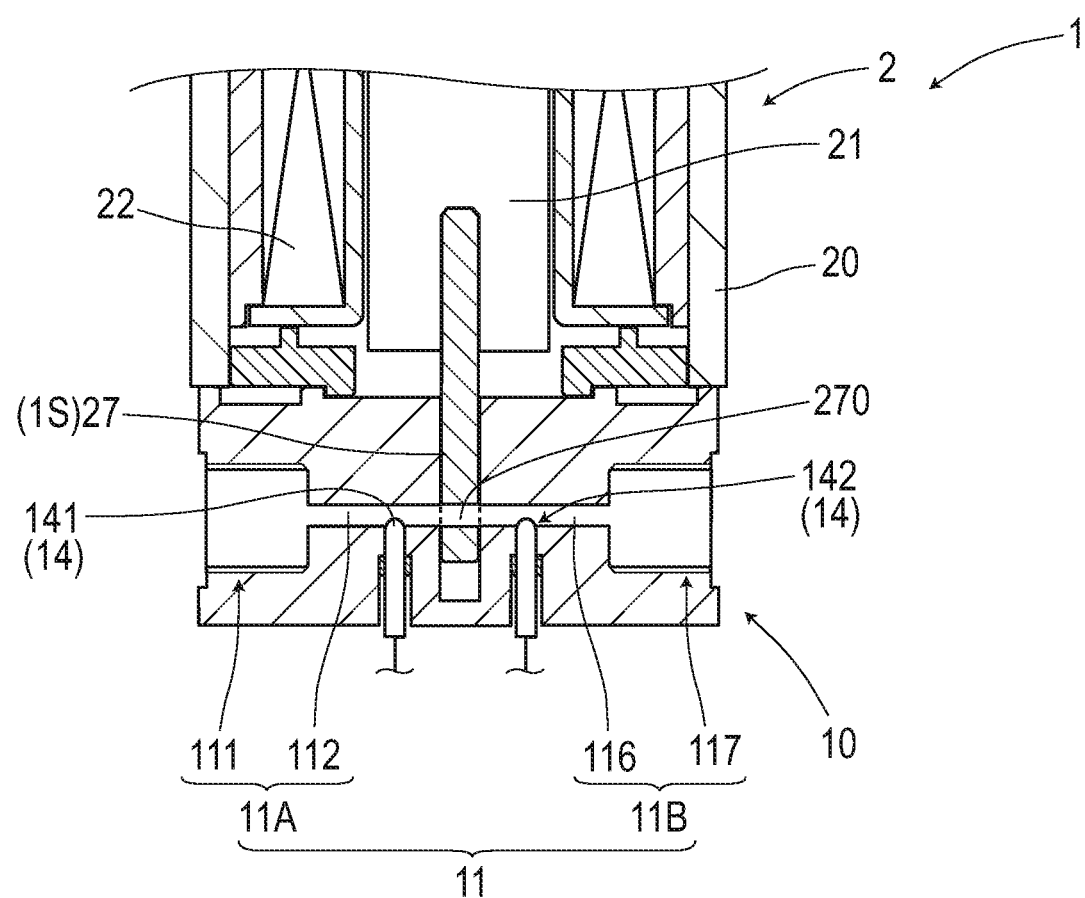
[FIG. 7]

[FIG. 8]
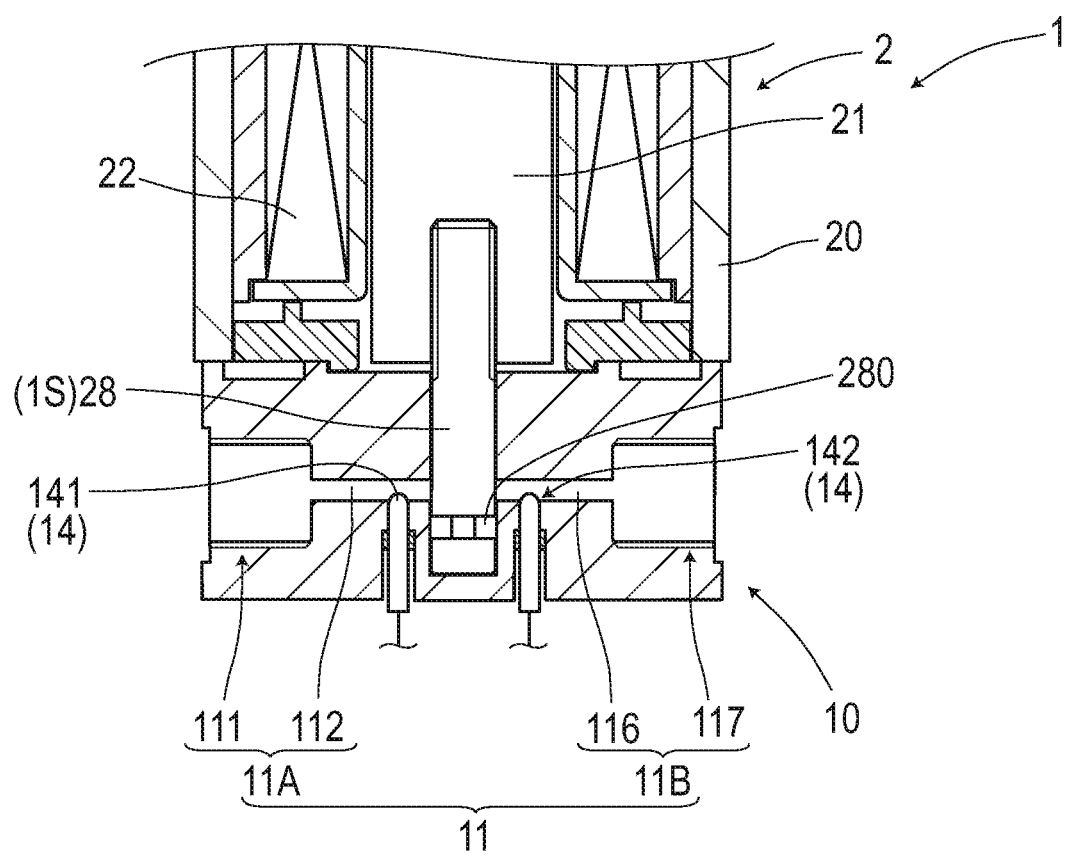

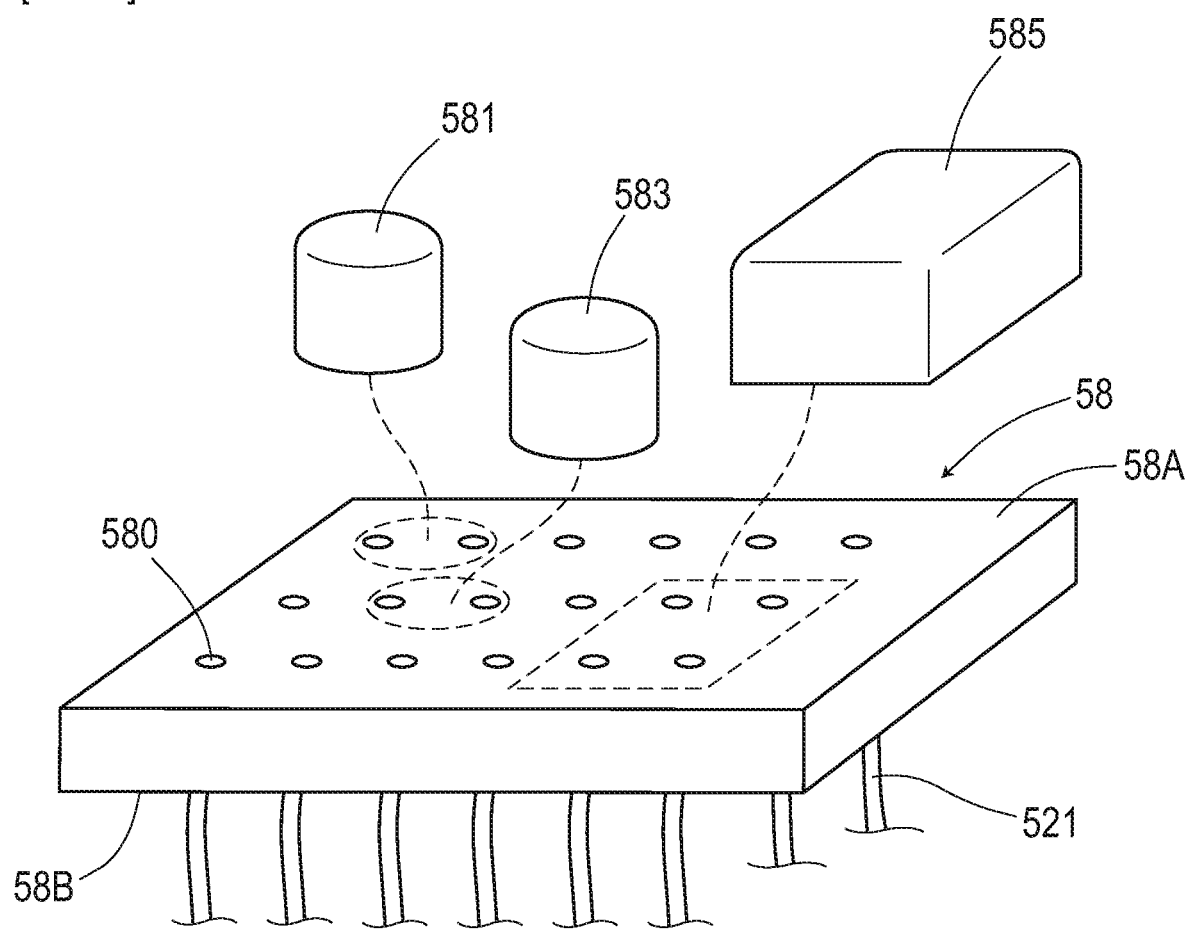
[FIG. 9]

[FIG. 10]
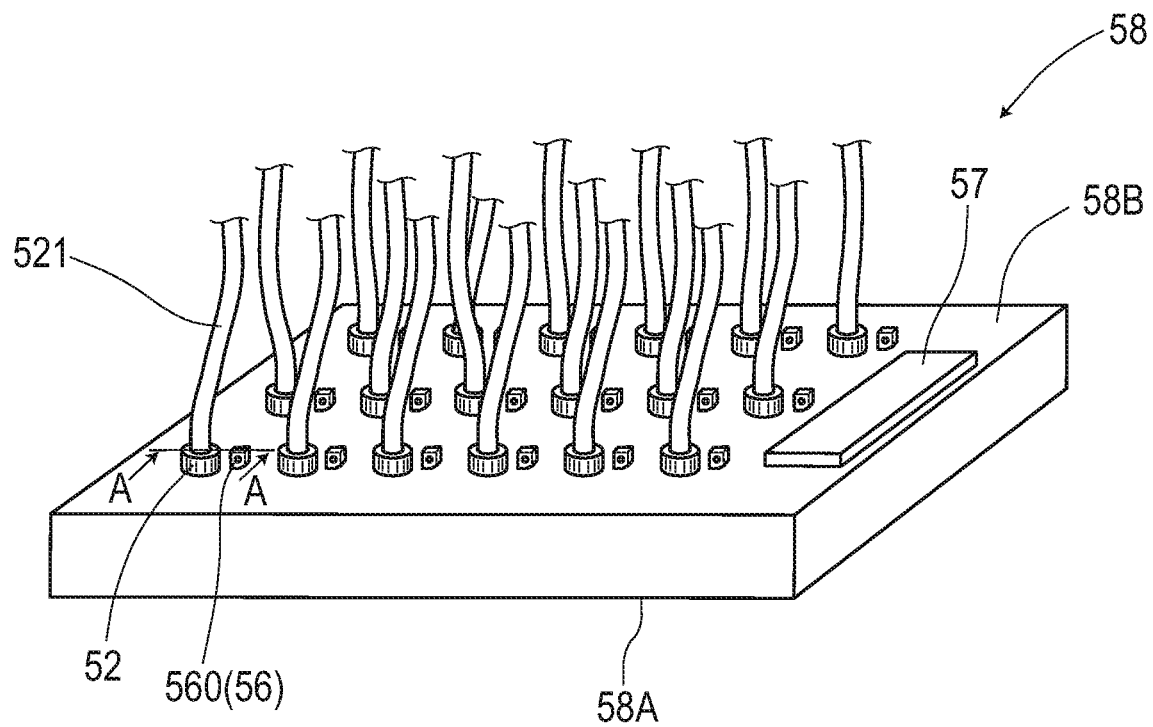

[FIG. 11]
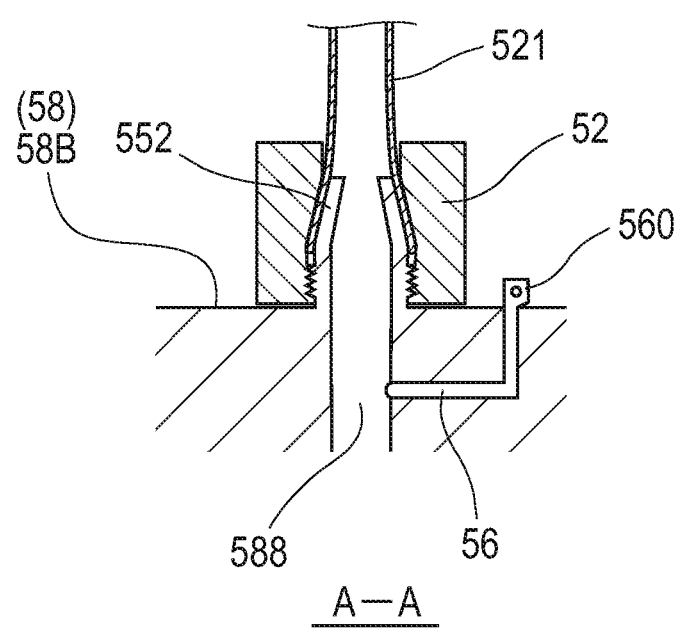
A—A

[FIG. 12]
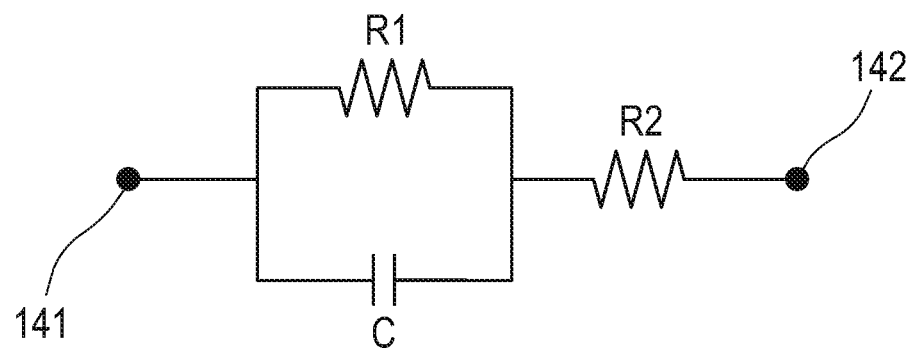

[FIG. 13]
(a) AC SIGNAL
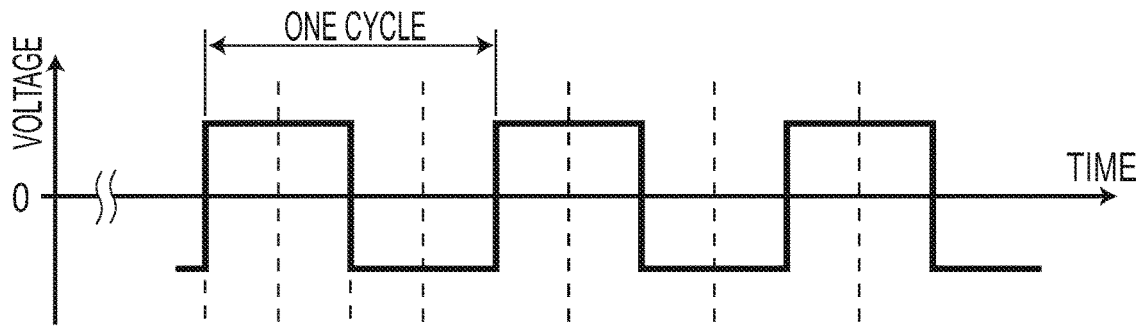
(b) INTERMEDIATE SIGNAL AT VALVE OPEN
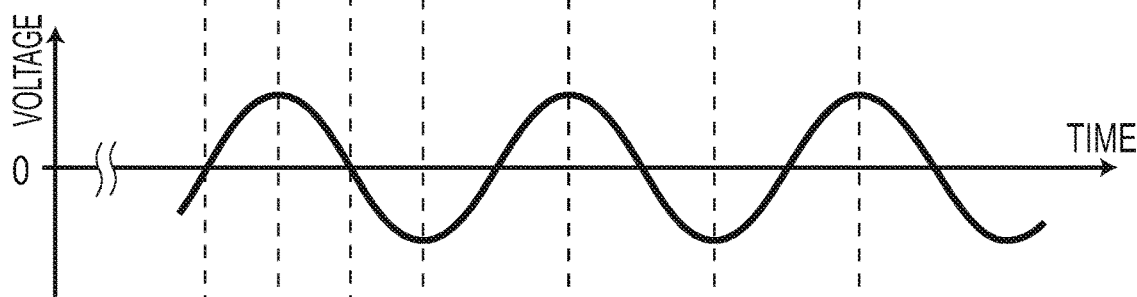
(c) INTERMEDIATE SIGNAL AT VALVE CLOSING
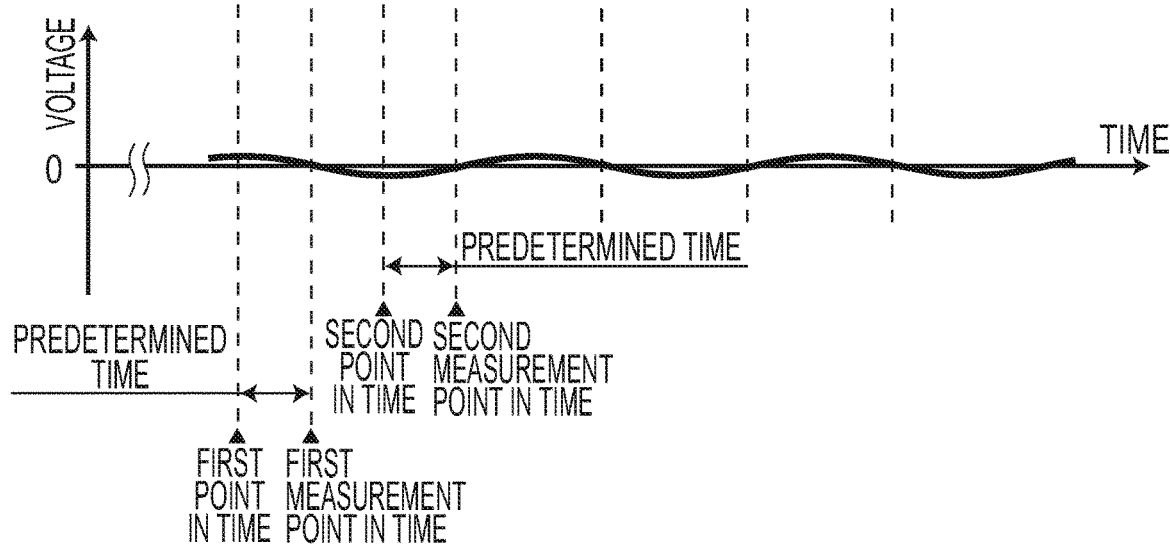

[FIG. 14]
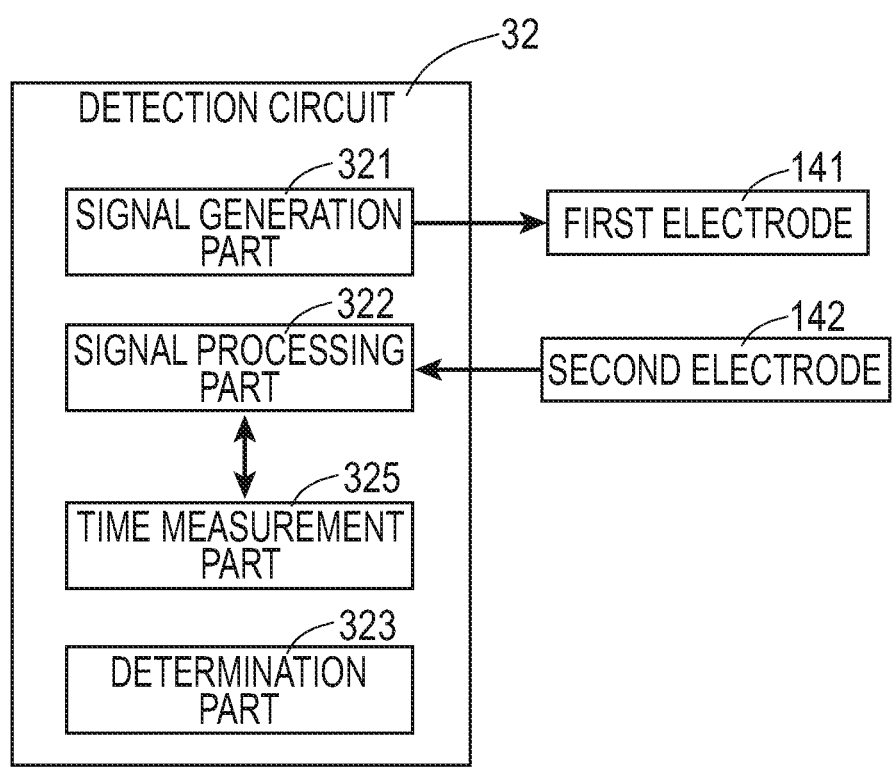

[FIG. 15]
(a) AC SIGNAL
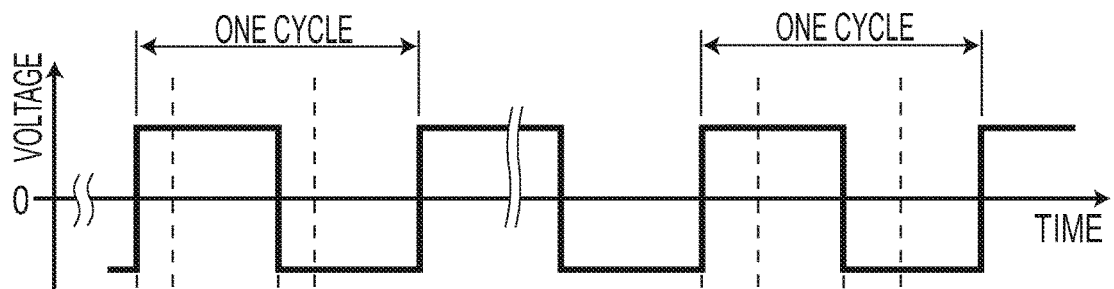
(b) INTERMEDIATE SIGNAL AT VALVE OPEN
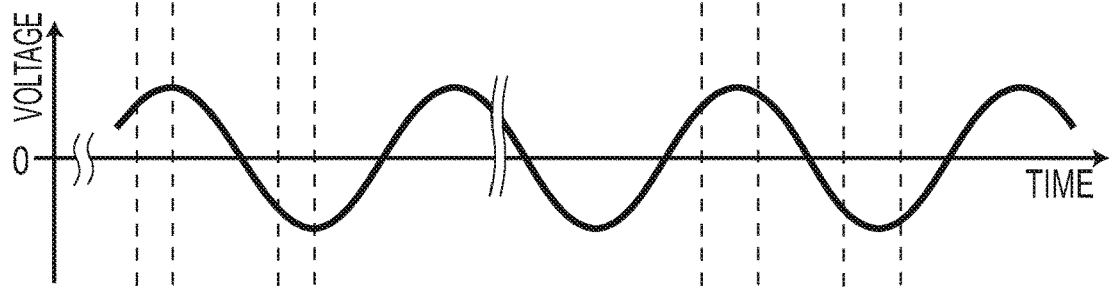
(c) INTERMEDIATE SIGNAL AT VALVE CLOSING
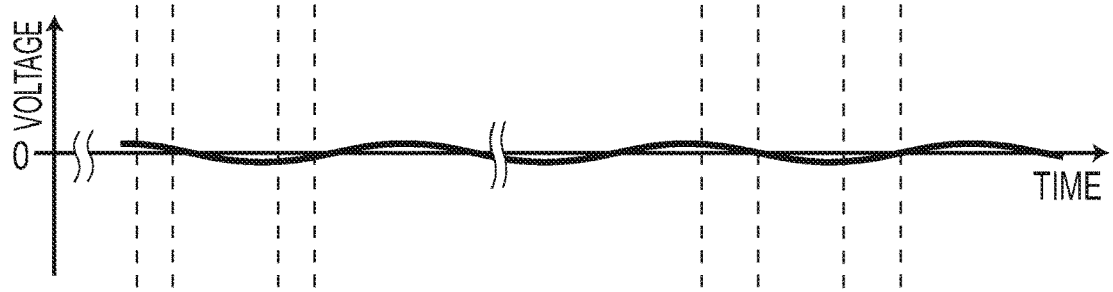
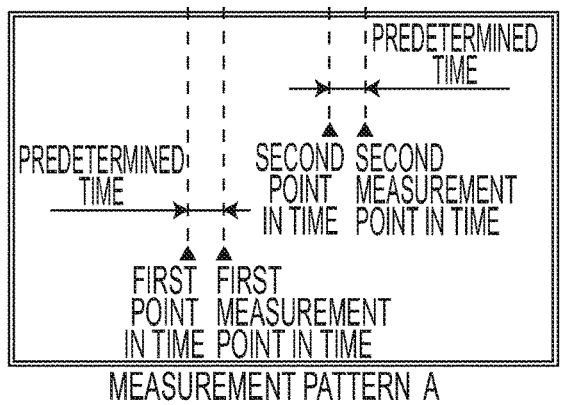
MEASUREMENT PATTERN A
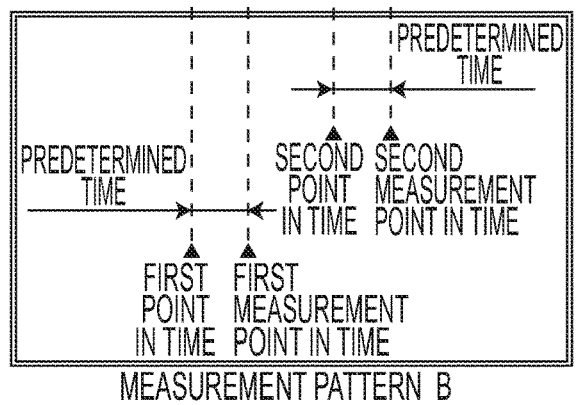
MEASUREMENT PATTERN B

FLUID DEVICE

TECHNICAL FIELD

The present invention relates to a fluid device including a flow path where a liquid flows.

BACKGROUND ART

Conventionally, various fluid devices having a flow path of a liquid have been known. Fluid devices of this type include valves, switch valves such as three-way valves or four-way valves, and pumps which pump a fluid to a flow path or suck the fluid, and manifolds provided with a plurality of flow paths. For example, in various analyzing devices and inspection devices handling chemical liquids, sample liquids, and so forth, since it is required to manage the flow rate of the liquid with high accuracy, a valve with high precision is adopted as a fluid device (for example, refer to PTL 1).

For example, as this valve, one is provided with a valve body driven to advance and retreat by an electromagnetic force and a valve seat onto which this valve body is pressed. In this valve or the like, while the valve body is pressed onto the valve seat to close the flow path, when the valve body retreats from the valve seat, a gap occurs therebetween to open the flow path.

CITATION LIST

Patent Literature

PTL 1: Japanese Unexamined Patent Application Publication No. 2016-75300

SUMMARY OF INVENTION

Technical Problem

However, the above-described conventional fluid devices such as valves have the following problems. That is, the liquid to be handled may have properties in which crystals tend to be deposited, and regular maintenance is required. On the other hand, if maintenance is insufficient, there is a possibility of occurrence of troubles such as liquid leakage and clogging.

The present invention was made in view of the above-described conventional problems and is to provide a fluid device including a function of detecting whether a state in which the liquid flows is appropriate or not.

Solution to Problems

The present invention is directed to a fluid device including a flow path where a liquid flows, the fluid device provided with, as electrodes for measuring a degree of electrical conductivity between the liquid in the flow path on an inflow upstream side and the liquid in the flow path on an outflow downstream side, a first electrode electrically in contact with the liquid on the upstream side and a second electrode electrically in contact with the liquid on the downstream side.

Advantageous Effects of Invention

The fluid device of the present invention includes the first electrode electrically conductive to the liquid on the upstream side and the second electrode electrically conductive to the liquid on the downstream side. A combination of the first electrode and the second electrode can be used for measurement of a degree of electrical conductivity between the liquid on the upstream side and the liquid on the downstream side.

In the fluid device of the present invention, by using the first and second electrodes, the degree of electrical conductivity between the liquid on the upstream side and the liquid on the downstream side can be relatively easily measured. This degree of electrical conductivity is in accordance with presence of a flow rate of the liquid flowing through the flow path of the fluid device. Therefore, by measuring this degree of electrical conductivity, liquid leakage, the flow rate of the liquid, and so forth can be detected.

In this manner, the fluid device of the present invention is suitable for measurement of the degree of electrical conductivity between the fluid on the upstream side and the liquid on the downstream side, and detection of liquid leakage, clogging, or the like is facilitated.

BRIEF DESCRIPTION OF DRAWINGS

FIG. 1 is a cross-sectional view depicting a cross-sectional structure of an electromagnetic valve in a first embodiment.

FIG. 2 is a perspective view depicting a cross-sectional structure of a flow path part in the first embodiment.

FIG. 3 is a block diagram of a control unit to be incorporated in the electromagnetic valve in the first embodiment.

FIG. 4 is a descriptive diagram depicting a valve-open state in the first embodiment.

FIG. 5 is a perspective view depicting a cross-sectional structure of another flow path part in the first embodiment.

FIG. 6 is a cross-sectional view depicting a cross-sectional structure of an electromagnetic valve including a slider in the first embodiment (closed state).

FIG. 7 is a cross-sectional view depicting a cross-sectional structure of the electromagnetic valve including the slider in the first embodiment (open state).

FIG. 8 is a cross-sectional view depicting a cross-sectional structure of an electromagnetic valve including a spool valve in the first embodiment (closed state).

FIG. 9 is a perspective view depicting a manifold in a second embodiment.

FIG. 10 is a perspective view of the manifold viewed from a tube connection surface side in the second embodiment.

FIG. 11 is a cross-sectional view depicting an electrode of the manifold in the second embodiment.

FIG. 12 is a circuitry diagram depicting an equivalent circuit of an electrical route between electrodes in a third embodiment.

FIG. 13 is a graph depicting an AC signal, an intermediate signal, and a detection signal in the third embodiment.

FIG. 14 is a block diagram of a control unit in a fourth embodiment.

FIG. 15 is a graph depicting an AC signal, an intermediate signal, and a detection signal in the fourth embodiment.

DESCRIPTION OF EMBODIMENTS

Fluid devices of the present invention include valves, switch valves such as three-way valves and four-way valves, and pumps which pump a fluid to a flow path or suck the fluid, as well as pipes and tubes having flow paths, and manifolds provided with a plurality of flow paths, and so forth. Furthermore, the pipes and tubes having flow paths may be linear single pipes, or branch pipes or collecting pipes having a branch point or merging point of flow paths. Targets of the present invention are various fluid devices having a flow path where a fluid flows.

The fluid device of one preferred mode in the present invention includes a circuit which measures the degree of electrical conductivity between the first electrode and the second electrode to detect whether the liquid flowing through the flow path is present or absent.

For example, in the case of the fluid device being a valve or the like which shuts off the flow of the liquid, when the liquid flowing through the flow path is present in the state of shutting of the flow, liquid leakage can be detected.

The fluid device of one preferred mode in the present invention includes a circuit which measures the degree of electrical conductivity between the first electrode and the second electrode to detect an amount of the liquid flowing through the flow path.

The flow path is a route where a liquid flows and also serves as an electrical route with the liquid as a medium. Thus, the degree of electrical conductivity varies in accordance with, for example, the area of the flow path and so forth. As the area (particularly a minimum area) of the flow path increases, the flow rate increases and also the degree of electrical conductivity increases. If the degree of electrical conductivity is measured, the amount of the liquid flowing through the flow path can be detected.

The fluid device of one preferred mode in the present invention includes a structure which is capable of setting a state in which the flow of the liquid is shut off and, in the state in which the flow of the liquid is shut off, the liquid on the upstream side and the liquid on the downstream side are electrically insulated.

In this case, in the state in which the flow of the liquid is shut off, the first electrode and the second electrode are electrically insulated. For example, when the first electrode and the second electrode become electrically conductive to each other in a shut-off state, a determination can be made such that a flow of the liquid is occurring, and a determination on liquid leakage is facilitated.

For example, in the case of a fluid device which is capable of switching the shut-off state in which the flow of the liquid is shut off and the open state in which the flow path is open, the flow rate can be adjusted by alternately switching the shut-off state and the open state in quick cycles. When alternate switching is made between the shut-off state and the open state in this manner, a period in which the flow path is opened and the degree of electrical conductivity is large and a period in which the flow of the liquid is shut off and the degree of electrical conductivity is small cyclically and repeatedly occur. In a period forming one cycle, if an occupancy rate of the period is large in which the flow path is opened and the degree of electrical conductivity is large, an average value of the degrees of electrical conductivity become large and the amount (flow rate) of the liquid flowing through the flow path is large. Therefore, by measuring the degree of electrical conductivity, the amount of the liquid flowing through the flow path can be detected.

The fluid device of one preferred mode in the present invention is a valve in which a seal part for shutting of the flow of the liquid is provided midway of the flow path, and the first and second electrodes are electrodes for measuring the degree of electrical conductivity between the liquid on the upstream side and the liquid on the downstream side adjacent to each other across the seal part in the flow path.

In this case, it is possible to measure the degree of electrical conductivity between the liquid on the upstream side and the liquid on the downstream side adjacent to each other across the seal part. As a valve, in addition to any of various analyzing devices and inspection devices handling chemical liquids, sample liquids, and so forth, it is useful for industrial machines such as hydraulic devices which operate by taking oil hydraulics or the like as a drive source or freezers which take a fluid as a medium, and valves for products for general consumers such as faucets in kitchens, washstands, and so forth.

The seal part in the valve may include a valve seat and a valve body, close the valve when the valve body is pressed onto the valve seat to shut off the flow of the liquid, and open the valve by causing a gap between the valve seat and the valve body.

In the case of this seal part, crystals may be deposited at a contact location between the valve seat and the valve body and cause a state of crystals being caught in the contact location between the valve seat and the valve body and, due to this, subtle liquid leakage may occur. If this subtle liquid leakage can be detected with high accuracy, it is possible to grasp, at an early stage, the necessity of maintenance work for removing the deposited crystals. And, early maintenance work can avoid worsening of troubles and so forth before they happen.

The fluid device may be a valve including a movable member which is displaced with action of an electromagnetic force occurring in response to energization, and having a drive part which drives the valve body by displacement of the movable member and a flow path part made of non-conductive material with a hole forming the flow path provided to be bored and also with the valve seat formed thereto. The drive part may be a solenoid using a coil with a wire wound therearound, or may be a solenoid using a laminated steel plate. Displacement of the movable member may be linearly advancing/retreating displacement, rotational displacement, turning displacement, or the like.

Also, the valve may include a cylindrical coil with a wire wound therearound and a columnar plunger arranged and inserted in the coil, and have a drive part which drives the valve body by advancement and retreat of the plunger in an axial direction and the flow path part made of non-conductive material with a hole forming the flow path provided to be bored and also with the valve seat formed thereto.

When the flow path part made of non-conductive material is adopted, it is easy to achieve a structure in which the liquid on the upstream side and the liquid on the downstream side are electrically insulated in a valve-closed state, a structure in which both are not electrically short-circuited, and so forth. For example, even when either one of the liquid on the upstream side and the liquid on the downstream side electrically makes contact with the conductive member configuring the drive part, if electrical insulation between the conductive member and the liquid on the other side is ensured by the flow path part, an electrical short circuit between the liquid on the upstream side and the liquid on the downstream side via the conductive member can be avoided.

EMBODIMENTS

Embodiments of the present invention are specifically described by using the following embodiments.

First Embodiment

In the present embodiment, a small-sized electromagnetic valve 1 (valve) with a leakage detecting function is exemplarily described as one example of the fluid device. Details of this are described with reference to FIG. 1 to FIG. 8.

The electromagnetic valve 1 embodying one example of a fluid device is provided with a seal part 1S including a valve seat 110 and a valve body 25 in midway of a flow path 11 where a liquid flows, and is a valve which can shut off the flow of the liquid. This electromagnetic valve 1 is configured so as to close with the valve body 25 pressed onto the valve seat 110 and open by generating a gap occurring between the valve seat 110 and the valve body 25.

The electromagnetic valve 1 includes as electrodes 14 a first electrode 141 electrically conductive to the liquid on an upstream side and a second electrode 142 electrically conductive to the liquid on a downstream side, electrodes 14 for measuring a degree of electrical conductivity between the liquid on the upstream side and the liquid on the downstream side of the flow path 11, or here, the liquid on the upstream side and the liquid on the downstream side of the valve seat 110 and the valve body 25 in the flow path 11.

In the following, details of this are described.

The electromagnetic valve 1 exemplarily depicted in FIG. 1 is configured to include a drive part 2 including a plunger 21 for driving the valve body 25, a flow path part 10 having the flow path 11 formed therein, and a control unit 3 (which will be described further below with reference to FIG. 3). As an assembling structure of the control unit 3 omitted in FIG. 1, a structure of assembling to an outer circumferential surface of the drive part 2, a structure of accommodating in a space provided inside the drive part 2 (case 20), and so forth can be adopted.

The drive part 2 is configured with the columnar plunger 21 arranged and inserted inside a cylindrical coil 22 with a wire wound therearound. The coil 22 is fixed to inside of a metal-made, bottom-closed, cylindrical case 20. A winding end at each of both ends of the coil 22 is taken out to the outside of the case 20 so as to be able to be connected to, for example, the control unit 3 fixed to the outside of the case 20.

The plunger 21 is a columnar part made of a ferromagnetic material. This plunger 21 is incorporated so as to be coaxial with respect to a cylindrical spring 210 arranged in a compressed state on a bottom side of the case 20. The plunger 21 is in a state of being biased by a biasing force of this spring 210 to a protruding side in an axial direction. In a distal end face of the plunger 21, a screw hole 211 is bored to have the columnar valve body 25 screwed therein.

The valve body 25 is a part having a shaft portion 252 as a resin-molded product combined with a rubber-made seal member 251. The shaft portion 252 has a film-shaped flange 253 integrally formed at an intermediate portion in the axial direction, and has an attachment structure provided at its distal end, the attachment structure to which the seal member 251 is to be attached. The seal member 251 forms a disk shape, and has a surface opposite to the shaft portion 252 as a seal surface to be biased onto the valve seat 110. The whole valve body 25 including the seal member 251, the flange 253, and so forth is formed of non-conductive material.

The flange 253 of the valve body 25 is configured so as to have its outer circumferential part fixed in a fluid-tight manner between the drive part 2 and the flow path part 10, when the flow path part 10 is attached to the drive part 2. This flange 253 prevents liquid leakage to the drive part 2 side in an assembled state, and also functions so as to allow a displacement of the valve body 25 in the axial direction in accordance with elastic deformation.

The flow path part 10 has a low-profile, substantially columnar outer shape as depicted in FIG. 1 and FIG. 2, and is attached to an end face of the drive part 2 which has a similar, substantially columnar shape. This flow path part 10 is a resin-finished product made of non-conductive resin material. Among surfaces of the flow path part 10, a surface 10A serving as an attachment surface for the drive part 2 has a bottom-closed hole 15 provided to be bored therein at the center. In the other surface 10B, attachment holes 140 for attaching the electrodes 14 are provided to be bored at two locations. Also, on the outer circumferential surface of the flow path part 10, openings 111 and 117 in the flow path 11 are formed at two locations positioned to face each other. In the inner circumferential surface of each of the openings 111 and 117, a screw thread is formed to which piping not depicted can be screwed.

In the flow path part 10, the flow path 11 is formed of a flow path 11A on an inflow side forming one opening 111 and a flow path 11B on an outflow side forming the other opening 117. This flow path 11 is not linear. In the flow path part 10, the flow path 11A on the inflow side and the flow path 11B on the outflow side communicate with each other via a bottom-closed hole 15 of the surface 10A forming the attachment surface for the drive part 2.

The flow path 11A on the inflow side is configured of a lateral hole 112 in a radial direction from the outer circumferential surface of the flow path part 10 to reach the center and a longitudinal hole 113 in the axial direction bored at the center of the bottom-closed hole 15 so as to be orthogonal to and communicate with this lateral hole 112. This longitudinal hole 113 configuring the flow path 11A on the inflow side is open to the bottom-closed hole 15 in a state of being surrounded by a cylindrical edge part provided to stand from the bottom surface of the bottom-closed hole 15. This cylindrical edge part functions as the valve seat 110 where the above-described valve body 25 is pressed.

The flow path 11A on the inflow side serves as a route from the opening 111 on the outer circumferential surface of the flow path part 10 via the inside of the flow path part to reach the valve seat 110. The inner circumferential surface of the flow path 11A on the inflow side is entirely formed of non-conductive resin material, thereby achieving electrical insulation from the drive part 2 side.

On the other hand, the flow path 11B on the outflow side is configured of a lateral hole 116 from the outer circumferential surface of the flow path part 10 to a position before reaching the center and a longitudinal hole 115 bored in the outer circumference of the bottom surface of the bottom-closed hole 15 so as to be orthogonal to and communicate with this lateral hole 116. Note that this longitudinal hole 115 forming the flow path 11B on the outflow side and the above-described longitudinal hole 113 forming the flow path 11A on the inflow side have a partition therebetween by the cylindrical edge part that functions as the valve seat 110.

The flow path 11B on the outflow side serves as a route from the opening 117 on the outer circumferential surface of the flow path part 10 via the inside of the flow path part 10 to communicate with the bottom-closed hole 15 and reach the valve seat 110 inside the bottom-closed hole 15. Since the bottom-closed hole 15 is open to the surface 10A forming the attachment surface for the drive part 2, a fluid-tight structure, which will be described further below, using the valve body 25 is adopted in the flow path 11B on the outflow side.

Although detailed depiction and detailed description are omitted, the surface 10A as the attachment surface of the flow path part 10 for the drive part 2 is provided with a fixing structure for the drive part 2. By using this fixing structure, the flow path part 10 is assembled to the drive part 2 with high reliability. Furthermore, on the surface 10A of the flow path part 10, a retaining part 150 for fixing the outer circumferential part of the flange 253 of the valve body 25 in combination with an end face of the drive part 2 is formed on the outer circumference of the bottom-closed hole 15. This retaining part 150 retains the outer circumferential part of the flange 253 in a fluid-tight manner when the flow path part 10 is fixed to the drive part 2. This flange 253 operates so as to restrict leakage of the liquid in the bottom-closed hole 15 to the drive part 2 side, configuring a fluid-tight structure of the flow path 11B on the outflow side.

The flow path 11B on the outflow side is a route from the opening 117 on the outer circumferential surface of the flow path part 10 via the inside of the flow path part 10 to reach the bottom-closed hole 15. The inner circumferential surface of the flow path 11B on the outflow side, including the inner circumferential surface of the bottom-closed hole 15, is entirely formed of non-conductive resin material. Also, the inner space of the bottom-closed hole 15 is retained in a fluid-tight manner by the flange 253 (valve body 25) made of non-conductive resin material so that the inner liquid does not make contact with the drive part 2 side. Thus, the liquid in the flow path 11B on the outflow side is also electrically insulated from the drive part 2 side.

When the flow path part 10 is assembled to the drive part 2, the state becomes such that the valve body 25 in a state in which the outer circumferential part of the flange 253 being retained by the retaining part 150 protrudes to the inside of the bottom-closed hole 15. In this state, the seal member 251 forming a distal end of the valve body 25 is pressed onto the valve seat 110 surrounding the flow path 11A on the inflow side. In this manner, with the valve body 25 driven by the drive part 2 to advance and retreat being pressed onto the valve seat 110 of the flow path part 10, the flow path 11A on the inflow side and the flow path 11B on the outflow side are shut off to allow a valve-closed state to be set. Note that the structure is such that, at the time of this valve-closed state in which the seal member 251 is pressed onto the valve seat 110, the liquid is accumulated on the upstream side of the valve seat 110 also accumulated to reside on the downstream side. Therefore, at the time of a valve-closed state, the state is such that the first electrode 141 is immersed in the liquid on the upstream side and the second electrode 142 is immersed in the liquid on the downstream side.

In the electromagnetic valve 1, as described above, both the flow path 11A on the inflow side and the flow path 11B on the outflow side are electrically insulated from the drive part 2 side. Furthermore, the valve body 25 and the valve seat 110 forming a communication location between the flow path 11A and the flow path 11B are formed of non-conductive material. Thereby, a structure is achieved in the electromagnetic valve 1 in which, in a valve-closed state where the flow path 11A on the inflow side and the flow path 11B on the outflow side are shut off, the flow path 11A on the inflow side and the flow path 11B on the outflow side are also electrically cut off (insulated).

In the flow path part 10, the paired electrodes 14 are provided to be buried in the attachment holes 140 at two locations on the surface 10B opposite to the attachment surface for the drive part 2. One electrode 141 penetrates through the inner circumferential wall surface of the lateral hole 112 forming the flow path 11A on the inflow side as the upstream side in a flow direction of the liquid in the flow path to protrude to the inside of the flow path 11. The other electrode 142 penetrates through the inner circumferential wall surface of the lateral hole 116 forming the flow path 11B on the outflow side as the downstream side in the flow direction of the liquid in the flow path to protrude to the inside of the flow path 11. Each electrode 14 is retained in the attachment hole 140 in a fluid-tight manner using a gasket 145. Note that a signal line provided to extend from each electrode 14 is connected to the control unit 3.

The control unit 3 exemplarily depicted in FIG. 3 is a unit which electromagnetically drives the plunger 21 in response to energization to the coil 22 and outputs a leak signal indicating the occurrence of liquid leakage at the time of valve closing. As described above, for example, this control unit 3 is attached to the outside of the case 20 of the drive part 2 in a state of being accommodated in a case not depicted.

The control unit 3 is configured to include a drive circuit 31 which controls energization to the coil 22 and a detection circuit (circuit) 32 for detecting liquid leakage at the time of valve closing.

The drive circuit 31 is a circuit for driving the plunger 21 to retreat in the axial direction opposite to the flow path part 10. The drive circuit 31 performs energization to the coil 22 in response to reception of an open signal from an external device 4, thereby electromagnetically driving the plunger 21 (refer to FIG. 1).

When the plunger 21 is driven to retreat oppositely to the flow path part 10, the valve body 25 moves away from the valve seat 110 of the flow path part 10 to generate a gap, thereby bringing about a valve-open state in which the flow path 11A on the inflow side and the flow path 11B on the outflow side communicate via this gap (refer to FIG. 4). On the other hand, at the time of non-energization to the coil 22, the plunger 21 protrudes to a flow path part 10 side to the axial direction by the biasing force of the spring 210, thereby causing the valve body 25 to be pressed onto the valve seat 110 of the flow path part 10 to bring about a valve-closed state in which the flow path 11A on the inflow side and the flow path 11B on the outflow side are shut off.

The detection circuit 32 is configured to include a signal generation part 321 which generates an AC signal, a signal processing part 322 which processes a detection signal, and a determination part 323 which determines liquid leakage. While applying the AC signal adjusted to have a predetermined voltage to the first electrode 141, the detection circuit 32 detects liquid leakage in accordance with a magnitude of a current occurring in the second electrode 142.

The signal generation part 321 is a circuit part which generates the AC signal at the predetermined voltage for application to the first electrode 141. As the AC signal, for example, a signal cyclically changing with a frequency of, for example, 1 KHz, or the like can be used. When the AC signal is applied to the electrode 141, electrolysis and crystal deposition that can occur at the electrode can be inhibited before they happen. In particular, if crystal deposition can be inhibited, accumulation of salt and so forth can be avoided, and accordingly changes in sensitivity characteristics of the electrode and so forth can be inhibited. Also, inhibition of electrolysis can inhibit changes in properties and so forth of the circulating liquid. In this manner, when electrolysis and crystal deposition that can occur at the electrode are inhibited before they happen by the application of the AC signal to the electrode 141, the occurrence of various troubles can be avoided before they happen.

Note that in the present embodiment, as the AC signal acting on the first electrode 141, an alternating square-wave (voltage) is adopted, in which a positive-value period and a negative-value period cyclically and alternately appear. As the AC signal, any of various signals can be adopted, such as a sine wave, triangular wave, and pulse wave. While the AC signal with a frequency of 1 kHz is adopted in the present embodiment, the frequency of the AC signal may be selectively set as appropriate. Also, when the AC signal with the predetermined voltage is applied, it is possible to inhibit influences such as fluctuations in power supply voltage being exerted on an output potential of the detection circuit 32, and detection accuracy can be improved. Note that expressions such as "an AC signal is acted onto the first electrode 141" or "a voltage is applied to the first electrode 141" mean that a voltage is applied between the first electrode 141 and the second electrode 142.

The signal processing part 322 is a circuit part which captures a current occurring at the second electrode 142 as the detection signal and converts the signal into the detection signal (voltage) that the determination part 323 can easily handle. Here, the current occurring at the second electrode 142 means a current flowing between the first electrode 141 and the second electrode 142 in accordance with a voltage applied between the first electrode 141 and the second electrode 142. When the above-described AC signal (voltage) is acted onto the first electrode 141, the signal processing part 322 has a function of amplifying the detection signal in alternating current (current) occurring at the second electrode 142, a function of converting the magnitude of the detection signal after amplification to a voltage value to generate an intermediate signal (AC voltage), and a function of generating the detection signal as one example of a measurement value indicating the magnitude of the amplitude of this intermediate signal. The function of generating the detection signal is achieved by the signal processing part 322 including a peak-hold circuit which holds a maximum value of the intermediate signal, a peak-hold circuit which holds a minimum value of the intermediate signal, and a differential circuit which generates a differential value between these maximum value and minimum value.

The signal processing part 322 provided with the above-described three functions acquires the intermediate signal of the AC voltage by current/voltage conversion based on the detection signal in alternating current (AC current) occurring at the second electrode 142, converts the intermediate signal to the detection signal with a DC voltage indicating the magnitude of the amplitude of that intermediate signal, and outputs that detection signal.

Note that the above-described function of generating the intermediate signal (AC voltage) may include a function of removing low-frequency components and high-frequency components by a band-pass filter. The frequential characteristics of this band-pass filter are preferably set so as to correspond to the frequency of the AC signal generated by the signal generation part 321. For example, when the AC signal cyclically changing with a frequency of 1 KHz is acted onto the electrode 141, a band-pass filter which selectively passes through signals of a frequency near 1 kHz is preferably adopted.

The determination part 323 is a circuit part which determines liquid leakage by performing a threshold process regarding the detection signal (voltage value) obtained by conversion by the signal processing part 322. In a valve-closed period in which the above-described open signal is not received, the determination part 323 performs the threshold process on the detection signal. Then, if the voltage value of the detection signal exceeds a predefined threshold, a determination is made as liquid leakage. When the determination part 323 makes the determination as liquid leakage, the control unit 3 outputs a leak signal indicating that liquid leakage has been detected to the external device 4.

With the electromagnetic valve 1 as the above-structured fluid device of the present embodiment, liquid leakage under a valve-closed state can be detected in accordance with the degree of electrical conductivity between the liquid on the upstream side in the flow path 11A on the inflow side and the liquid on the downstream side in the flow path 11B on the outflow side. With this electromagnetic valve 1, for example, even when handling a liquid where crystals are easily deposited, it is possible to detect, at an early stage, liquid leakage that can occur due to defective sealing caused by crystals deposited on the valve seat 110.

If maintenance of the electromagnetic valve 1 and so forth is performed in accordance with the occurrence of a leak signal indicating liquid leakage, it is possible to avoid worsening of a symptom of liquid leakage occurring at the valve seat 110, the valve body 25, and so forth, or a trouble or the like of an external device, not depicted, operating upon receiving supply of the liquid from the electromagnetic valve 1 before they happen.

Although the electromagnetic valve 1 including the control unit 3 is exemplary described in the present embodiment, the control unit 3 may be omitted. In this case, it is preferable to perform open/close control of the electromagnetic valve 1 via a power line for energizing the coil 22 and perform detection of liquid leakage and so forth via a signal line connected to the electrodes 14. In this case, provided that measures against noise are sufficiently taken, a GND line can be shared between a drive circuit 31 side to the coil 22 and a liquid-leakage detection circuit 32 side.

In the electromagnetic valve 1 of the present embodiment, the flow path part 10 made of a resin material as one example of non-conductive material is adopted, and the structure is adopted in which the liquid in the flow path 11 does not make contact with metal parts of the drive part 2. In this electromagnetic valve 1, the liquid on the inflow side on the upstream side of the valve seat 110 and the valve body 25 and the liquid on the outflow side on the downstream side are not electrically conductive via formation material of the flow path part 10 or the drive part 2. In a valve-closed state, electrical insulation of the liquid on the inflow side on the upstream side and the liquid on the outflow side on the downstream side can be ensured with high reliability.

In place of this structure, the structure may be such that, in a valve-closed state, the liquid on the inflow side and the liquid on the outflow side electrically conduct via the component parts of the electromagnetic valve 1. In this case, in comparison with the magnitude of electrical resistance via these component parts, whether the electrical resistance of the liquid is sufficiently small or not will be a matter. It is required that the magnitude of electrical resistance via the component parts of the electromagnetic valve 1 is a magnitude to the extent that the electrical resistance of the liquid can be handled as a finite value. Furthermore, it is preferable that the magnitude of electrical resistance via the component parts of the electromagnetic valve 1 is sufficiently large compared with the electrical resistance of the liquid (electrical conductance of the component parts of the electromagnetic valve 1 should be negligible with reference to the electrical conductance of the liquid).

In this case, even with the structure as described above in which the liquid on the inflow side and the liquid on the outflow side of the electromagnetic valve 1 are electrically conductive via the component parts of the electromagnetic valve 1, an index value indicating a degree of electrical conductivity such as electrical resistance between both can be measured. And, liquid leakage or the like can be detected based on changes of this index value.

While the electromagnetic valve 1 which drives the valve body 25 to open the valve is exemplarily described in the present embodiment, a configuration in which liquid leakage is detected by measuring the degree of electrical conductivity between the liquid on the inflow side and the liquid on the outflow side can be applied to any of various valves, such as a manual valve, a valve using a stepping motor, and so forth.

In the present embodiment, a configuration is exemplarily described in which the detection circuit 32 determines whether liquid leakage is present or absent by the threshold process regarding the voltage value of the detection signal. In place of this, the flow rate of the liquid may be measured in accordance with the magnitude of the voltage value of the detection signal. Also, for example, when the electromagnetic valve 1 is driven by duty control in which opening and closing are cyclically repeated, the flow rate may be calculated by estimating a degree of valve opening based on a temporal average value of voltage values of the detection signal. The flow rate may also be calculated by estimating a degree of valve opening from a ratio between a period in which the voltage value of the detection signal is Hi and a period in which it is Lo.

Furthermore, the detection circuit 32 may be provided with a threshold setting part for appropriately setting the threshold value to be applied to the above-described threshold process. As threshold setting methods by this threshold setting part, the following methods can be thought, for example.

(First Setting Method)

A method of setting the threshold value by multiplying, by a coefficient, a magnitude (voltage value) of the detection signal when the electromagnetic valve 1 is closed. As this coefficient, for example, a value exceeding 1.0 can be set, such as 1.1 or 1.2.

(Second Setting Method)

A method of setting the threshold value by multiplying, by a coefficient, the magnitude (voltage value) of the detection signal when the electromagnetic valve 1 is open. As this coefficient, for example, a value such as $1/10$ or $1/100$ can be set.

(Third Setting Method)

A method of setting the threshold value by multiplying, by a coefficient, a value obtained by dividing the magnitude (voltage value) of the detection signal when the electromagnetic valve 1 is closed by the magnitude (voltage value) of the detection signal when the electromagnetic valve 1 is open. As this coefficient, for example, a value exceeding 1.0 can be set, such as 1.1 or 1.2. A target for the threshold process in this case is a value obtained by dividing the magnitude of the target detection signal by the magnitude (voltage value) of the detection signal when the electromagnetic valve 1 is open.

Note that the threshold process using the threshold value set as described above may be a process by a digital circuit or a process by an analog circuit.

As for the function of the signal processing part 322 which amplifies the detection signal in alternating current occurring at the electrodes 14, a plurality of types of amplification factors may be provided. While there is a possibility that a faint detection signal may be overlooked if the amplification factor is small including an amplification factor of 1, if the amplification factor is large, saturation may occur when a large detection signal occurs. When a plurality of types of amplification factors are provided, processing can be performed by selecting the detection signal of which the magnitude after amplification is in an appropriate range. Such configuration is effective when the electrical conductance of the liquid to be handled is unknown or varies, and is useful in improving versatility.

Note that in the present embodiment, a voltage-value detection signal is exemplarily described as the detection signal that is generated by the signal processing part 322 for use in liquid leakage determination by the determination part 323. With the voltage-value detection signal, for example, even if this detection signal is outputted as it is to external devices, handling on a reception side is relatively easy, and the circuit structure for handling the detection signal can be simplified.

A part may be provided which outputs the detection signal of the signal processing part 322 or the leak signal of the control unit 3 to the outside not connected via a signal line or the like. For example, if the signal is outputted to a communication channel network such as the Internet via a wireless LAN or the like, the operating state of the electromagnetic valve 1 can be monitored from outside.

In the present embodiment, the flow path part 10 with the metal-made electrodes 14 fitted into the attachment holes 140 are exemplarily described. The electrodes 14 may be provided by insert molding. Alternatively, as in FIG. 5, for example, the flow path part 10 may be fabricated by two-color molding by a first resin material having conductivity and a second resin material having electrical insulation. It is preferable that, while a main body part of the flow path part is formed of the above-described second resin material, electrical routes functioning as the electrodes 14 may be formed of the above-described first resin material.

Furthermore, a rubber with a conductive material such as carbon nanotube blended therein to enhance conductivity may be adopted as an electrode. The electrode made of rubber may be arranged, for example, in a resin material by insert molding or the like, or may be press-fit or the like into the attachment hole 140 provided to be bored in advance. In the case of press-fitting, since the electrode made of rubber is moderately deformed to function as a seal material, it is not required to separately provide a seal material in addition to the electrode, and the number of parts can be reduced.

In the present embodiment, the seal part 1S including the valve seat 110 and the valve body 25 is exemplarily described. The structure of the invention of the present application can be applied also to valves as fluid devices provided with the seal part 1S including a slider 27 (FIG. 6 and FIG. 7), the seal part 1S including a spool valve (FIG. 8), or the like.

The electromagnetic valve 1 of FIG. 6 is a slide-type valve called a slider valve. In this electromagnetic valve 1, a partition plate called the slider 27 with a flow path hole 270 provided to be bored is used to configure the seal part 1S. When this slider 27 vertically moves by electromagnetic driving to cause the flow path hole 270 to match the flow paths 11A and 11B, the flow paths 11A and 11B communicate with each other (FIG. 7), and when the flow path hole 270 does not communicate with the flow paths 11A and 11B, the flow path is shut off (FIG. 6). In the slider valve of FIG. 6 and FIG. 7, changes in capacity of the flow paths 11A and 11B by vertical movement of the slider 27 are structurally zero, and thus an excellent characteristic is achieved in which a pumping volume can be avoided.

The electromagnetic valve 1 of FIG. 8 is a slide-type valve including the columnar spool valve 28. An intermediate portion of the spool valve 28 which vertically advances and retreats by electromagnetic driving is provided with a neck part 280 with a small diameter. This neck part 280 functions similarly to the flow path hole 270 of the slider 27 described above to switch between communication and shut-off of the flow paths 11A and 11B.

In the case of these slide-type valves, there is a possibility that the movement of the slider 27 or the spool valve 28 is inhibited by crystals deposited on the seal part is. If subtle liquid leakage is detected, the necessity of maintenance work can be grasped at an early stage. And, with the early maintenance work, it is possible to avoid a situation before it happens, the situation in which symptoms of insufficient vertical movement strokes due to inhibition of the movement of the slider 27 or the like become apparent.

In the present embodiment, exemplarily described is the fluid device (electromagnetic valve 1) in the structure in which, at the time of the valve-closed state, the liquid is accumulated on the upstream side of the valve seat 110 and the also accumulated to reside on the downstream side. In this fluid device, the state becomes such that, at the time of the valve-closed state, the first electrode 141 is immersed in the liquid on the upstream side and the second electrode 142 is immersed in the liquid on the downstream side. Of fluid devices, there is a device in which, at the time of the valve-closed state, the liquid on the downstream side of the valve is discharged to cause the flow path to become empty. In the case of this fluid device, the first electrode 141 and the second electrode 142 may be provided to the downstream side. When liquid leakage is present at the time of the valve-closed state, the electrical resistance between the electrodes 141 and 142 becomes small, and therefore liquid leakage can be detected. Also, in the case of a fluid device such as a pipe or tube in which while the flow path is filled with the liquid in a state in which the liquid is flowing, the liquid is discharged from the flow path to cause the flow path to become empty in a state in which the liquid does not flow, the first electrode 141 and the second electrode 142 are preferably provided in the flow paths without distinction between the upstream side and the downstream side.

By the electrical resistance between the electrodes 141 and 142 or the like, it is possible to determine whether the state is such that the liquid flows. In this case, the first electrode 141 and the second electrode 142 may be at the same position or different positions in a direction in which the liquid flows.

Second Embodiment

The present embodiment is an example of a structure in which, based on the structure of the first embodiment, a manifold 58 as a fluid device is provided with electrodes 56. Details of this are described with reference to FIG. 9 to FIG. 11.

The manifold 58 of FIG. 9 and FIG. 10 is a manifold having a plate shape, with a plurality of flow paths 588 (FIG. 11) provided to a resin-made flat plate. One surface of both of the front and back surfaces of the manifold 58 is an installation surface 58A to which devices such as an electromagnetic valve 581, a four-way valve 585, and a pump 583 are installed. Opening holes 580 in the installation surface 58A are holes for supplying the liquid to these devices or circulating the liquid flowing out from these devices. In this manifold 58, the function of the manifold 58 can be changed in accordance with the type of device to be attached to the installation surface 58A and the location for attachment.

To a tube connection surface 58B as a surface of the manifold 58 opposite to the installation surface 58A, a detection circuit 57 is attached (FIG. 10), and also a plurality of tubes 521 are connected. Note that in FIG. 10, depiction of devices such as the pump 583 is omitted.

On the tube connection surface 58B, as in FIG. 11, a nipple 552 having a tapered tip portion and provided with a screw portion at the intermediate portion is provided to stand for each flow path 588. A fastening nut 52 is screwed into the nipple 552 having the tube 521 externally arranged and fitted to the tapered tip portion, thereby causing the tube 521 to be connected in a fluid-tight manner to each flow path 588 of the manifold 58.

In the manifold 58, a hook-shaped electrode 56 provided with a connector part 560 at one end portion is provided to be buried so as to correspond to each flow path 588. Each electrode 56 provided to be buried by insert molding has a tip opposite to the connector part 560 exposed to an inner circumferential wall surface of the flow path 588 and has the connector part 560 at the other end protruding from the tube connection surface 58B corresponding to an outer circumferential side of the nipple 552. Each connector part 560 is electrically connected to the detection circuit 57 via a signal line not depicted. In the manifold 58, by changing the combination of the connector parts 560 as appropriate, the combination of the flow paths 588 as targets for measuring the degree of electrical conductivity between the liquids can be switched.

For example, as in FIG. 9, with an inflow port and an outflow port of the electromagnetic valve 581 as a device being connected to two adjacent opening holes 580 of the installation surface 58A, the tube 521 corresponding to the opening hole 580 connected to the inflow port of the electromagnetic valve 581 serves as an upstream-side tube, and the tube 521 corresponding to the opening hole 580 connected to the outflow port of the electromagnetic valve 581 serves as an downstream-side tube. In this case, a flow path of the upstream-side tube 521→the flow path 588→the electromagnetic valve 581→the flow path 588→the downstream-side tube 521 is formed. And, a "fluid device" is formed, with two electrodes disposed in that flow path on the upstream side and the downstream side across the electromagnetic valve 581.

Here, in conventional manifolds and the like, there is a problem in which when an anomaly occurs, it is difficult to specify a location of occurrence of the anomaly such as leakage and the location where leakage is occurring is hardly found. On the other hand, when the manifold 58 of the present embodiment provided with the electrode 56 is applied, when an anomaly such as leakage occurs, it is easy to specify the anomaly occurrence location and maintenance work such as replacement of a valve relevant to the anomaly occurrence location can be quickly and appropriately performed.

Note that other structures, operations, and effects are similar to those of the first embodiment.

Third Embodiment

The present embodiment is an example obtained by changing the details of signal processing, based on the electromagnetic valve of the first embodiment, to improve accuracy of leakage detection. Details of this are described with reference to FIG. 3, FIG. 12, and FIG. 13.

Prior to description of the configuration of the present embodiment, an electrical route between the first electrode 141 and the second electrode 142 is first described. In the electrical route between the first electrode 141 and the second electrode 142, due to the presence of an interface where the electrodes 141 and 142 make contact with the liquid and so forth, stray capacitance causing electrical action similar to that of a capacitor as an electronic part which accumulates electric charges, electrical resistance, and so forth are present. The electrical route between the first electrode 141 and the second electrode 142 can be represented by an equivalent circuit as in FIG. 12. In this equivalent circuit, a resistance R1 is an electrical resistance of the route between electrodes 141 and 142 with the liquid, the valve seat 110, and so forth intervened therebetween. A capacitance C is a stray capacitance between the electrodes 141 and 142. A resistance R2 is an electrical resistance caused by internal resistance of the electrode 141 and 142, electric wiring, and so forth. Note that a stray capacitance not depicted is present also at the above-described internal resistance and electric wiring.

When the capacitance C is present between the electrodes 141 and 142, in response to positive-negative switching of the AC voltage (AC signal) to be applied to the first electrode 141, a slight current flows at the second electrode 142 for charging and discharging the capacitance C. Also, the directions of the current occurring at the second electrode 152 are in opposite directions in the cases when the AC signal is changed from positive to negative and when the AC signal is changed from negative to positive. Therefore, even at the time of normal valve closing of the electromagnetic valve, when the AC signal is acted onto the first electrode 141, an AC current (intermediate signal) occurs at the second electrode 142. With this, even in a normal valve-closed state without liquid leakage, the detection signal indicating the amplitude of the intermediate signal does not become zero, and this may cause an occurrence of erroneous detection of liquid leakage.

In the first embodiment described here above, to generate the detection signal indicating the magnitude of the amplitude of the intermediate signal (AC voltage) occurring on the second electrode 142 side, the peak-hold circuit which holds the maximum value of the intermediate signal, the peak-hold circuit which holds the minimum value of the intermediate signal, and so forth are used. And, the differential value between the maximum value and the minimum value of the intermediate signal is obtained by the differential circuit, and a voltage value corresponding to this differential value is taken as the detection signal. As described above, since the intermediate signal has an amplitude even at the time of valve closing of the electromagnetic valve, the detection signal does not become zero. Therefore, in the configuration of the first embodiment, the degree of difficulty in distinguishing whether the detection signal is a signal generated due to liquid leakage or in a normal valve-closed state is high. At the time of leakage detection, to inhibit erroneous detection under a normal valve-closed state, it is required to set the threshold value when the threshold process is applied to the detection signal (voltage value), taking into account the magnitude of the detection signal in a normal valve-closed state.

By contrast, in the present embodiment, a differential value between measurement values at two measurement points in time appropriately set is taken as the detection signal, and thus the magnitude of the detection signal in a normal valve-closed state is approximately zero. With this, it is easy to set the threshold value to be applied to the threshold process at the time of leakage detection, and accuracy of leakage detection is improved by the appropriate threshold setting. In the following, a method of setting measurement points in time in the present embodiment is described.

The resistance R1 in the equivalent circuit of FIG. 12 significantly fluctuates depending on whether the electromagnetic valve is in a valve-open state or valve-closed state. In a valve-open state, the electrodes 141 and the electrodes 142 make contact with each other via intervention of the liquid in the flow path, and the resistance R1 is thus decreased. On the other hand, in a valve-closed state, the liquid on the upstream side and the liquid on the downstream side are divided by the valve seat 110, valve body 25, and so forth, and the resistance R1 is thus increased. This magnitude of the resistance R1 affects the phase of the intermediate signal on the second electrode 142 side. When a comparison is made between the intermediate signal in a state in which the resistance R1 is sufficiently large at the time of valve closing and the intermediate signal in a state in which the resistance R1 is small at the time of valve open, a phase difference of 90 degrees occurs (refer to FIG. 13). Note that when R1 at the time of valve open is denoted as $R_{Lo}$, R1 at the time of valve closing is denoted as $R1c$, and a reactance value by interelectrode capacitance is denoted as $Xc$, a condition for occurrence of the phase difference of 90 degrees is $R1c \gg Xc \gg R_{Lo}$.

When the phase difference between the intermediate signal at the time of valve open (FIG. 13(b)) and the intermediate signal at the time of valve closing (FIG. 13(c)) is 90 degrees, the intermediate signal at the time of valve closing is zero when the intermediate signal at the time of valve open has a maximum value, and the intermediate signal at the time of valve closing is zero when the intermediate signal at the time of valve open has a minimum value. Thus, in the configuration of the present embodiment, two points where the intermediate signal at the time of valve open has the maximum value and the minimum value are set as measurement points in time so that the detection signal at the time of valve closing (voltage value indicating the magnitude of the amplitude of the intermediate signal) is zero.

On the other hand, as depicted in FIG. 13, a phase shift of the intermediate signal at the time of valve closing with respect to the AC voltage (AC signal of FIG. 13(a)) to be applied to the first electrode 141 is approximately 90 degrees. Therefore, the above-described two measurement points in time are in combination of a first measurement point in time after a lapse of a predetermined time corresponding to a ¼ cycle with reference to a first point in time when a square-wave AC signal is switched from negative to positive and a second measurement point in time after a lapse of the predetermined time corresponding to the ¼ cycle with reference to a second point in time when the AC signal is switched from positive to negative. And, in the present embodiment, a differential value between a first measurement value indicating the magnitude of the intermediate signal at the first measurement point in time and a second measurement value indicating the magnitude of the intermediate signal at the second measurement point in time is taken as the detection signal.

According to the configuration of the present embodiment, at the time of valve closing of the electromagnetic valve, the magnitude of the detection signal becomes zero even if the intermediate signal when an AC voltage (AC signal) is applied to the first electrode 141 has an amplitude. On the other hand, when liquid leakage occurs at the time of valve closing of the electromagnetic valve, the intermediate signal become close to one at the time of valve open, and thus the absolute values of the intermediate signals at the above-described first and second measurement points in time increase, and accordingly the value of the detection signal indicating the differential value increases. Therefore, in the configuration of the present embodiment, by applying, for example, the threshold process with the threshold value close to zero to the magnitude of the detection signal, liquid leakage can be detected with high accuracy.

Furthermore, in the present embodiment, the configuration is adopted in which the magnitude of the intermediate signal is measured at two measurement points in time and a difference is taken to generate the detection signal. With this configuration, a peak-hold circuit is not required, and thus the circuit structure of the detection circuit 32 can be simplified, and cost reduction is easy.

Note that when the above-described intermediate signal (AC voltage) is generated, a band-pass filter is preferably applied to remove low-frequency components and high-frequency components. The frequential characteristics of this band-pass filter are preferably set so as to correspond to the frequency of the AC signal generated by the signal generation part 321. For example, when the AC signal cyclically changing with a frequency of 1 KHz is acted onto the electrode 141, a band-pass filter which selectively passes through signals of frequency near 1 kHz is preferably adopted.

Also, in the present embodiment while the square wave is exemplarily described as the AC signal (AC voltage) to be applied to the first electrode 141, the AC signal may be a sine wave or the like.

Note that other structures, operations, and effects are similar to those of the first embodiment.

Forth Embodiment

The present embodiment is an example obtained by changing, based on the configuration of the third embodiment, settings of measurement points in time of the intermediate signal for generating the detection signal. Details of this are described with reference to FIG. 14 and FIG. 15.

While the phase difference between the AC voltage (AC signal) to be applied to the first electrode 141 and the intermediate signal at the time of valve closing is approximately 90 degrees, the phase shift of the intermediate signal at the time of valve open with respect to the AC voltage (AC signal) to be applied to the first electrode 141 may fluctuate up to 90 degrees exemplarily described in the fourth embodiment.

In the present embodiment, as depicted in FIG. 14, a time measurement part 325 for measuring a shift time corresponding to the above-described phase shift is added to the detection circuit 321 which detects liquid leakage. As in FIG. 15, when the electromagnetic valve is in a valve-open state, with reference to the first point in time when the AC voltage (AC signal) to be applied to the first electrode 141 is switched from negative to positive or the second point in time when it is switched from positive to negative, the time measurement part 325 measures a shift time until the intermediate signal reaches a maximum value or minimum value. The time measurement part 325 specifies a point in time when the signal reaches the maximum value and a point in time when the signal reaches the minimum value by, for example, repeating measurement of the intermediate signal in a cycle sufficiently quicker than 1 kHz, which is the frequency of the AC signal, thereby measuring the above-described shift time.

In the configuration of the present embodiment, this shift time is handled as a predetermined time for setting measurement points in time. As in FIG. 15, with reference to the first point in time when the AC voltage (AC signal) to be applied to the first electrode 141 is switched from a negative value to a positive value, a point in time shifted by the above-described shift time is set as the first measurement point in time and, with reference to the second point in time when the AC voltage is switched from a positive value to a negative value, a point in time shifted by the above-described shift time is set as a second measurement point in time. And, the first measurement value of the intermediate signal at the first measurement point in time is acquired and the second measurement value of the intermediate signal at the second measurement point in time is acquired, and the differential value between the first and second measurement values is taken as the detection signal.

Although the phase shift between the intermediate signal when the electromagnetic valve is open and the intermediate signal when the electromagnetic valve is closed is not 90 degrees (refer to FIG. 15), the detection signal can be made at maximum at the first measurement point in time when the intermediate signal at the time of valve open has the maximum value and the second measurement point in time when it has the minimum value (a measurement pattern A in FIG. 15). On assumption that the noise level is at random and approximately constant, when the above-described first measurement point in time and the above-described second measurement point in time are set, a signal ratio with respect to noise (S/N ratio) can be maximized.

In the present embodiment, points in time of the maximum value and the minimum value of the intermediate signal at the time of valve open are set as measurement points in time (measurement pattern A in FIG. 15). For example, under a condition in which the noise level is relatively low and does not affect determining valve open and valve closing, a point in time when the intermediate signal at the time of valve closing is switched from positive to negative to cross zero can be set as the first measurement point in time and a point in time when it crosses from negative to positive can be set as the second measurement point in time (measurement pattern B in FIG. 15). Thereby, the detection signal in accordance with a degree of leakage can be acquired with high accuracy from a valve-closed state.

As described above, according to the configuration of the present embodiment, even if the phase shift of the intermediate signal (at the time of valve closing) with respect to the AC voltage (AC signal) to be applied to the first electrode 141 is shifted from approximately 90 degrees, a measurement point in time of the intermediate signal can be appropriately set. Thereby, it is possible to make the magnitude of the detection signal at the time of valve closing close to zero.

Note that other structures, operations, and effects are similar to those of the third embodiment.

While specific examples of the present invention have been described in detail as the embodiments, these specific examples each merely disclose one example of technology included in the claims. While configuration of fluid devices in which a device such as a valve intervenes a flow path is exemplarily described in the embodiments, the fluid device may be a device in which a pump or switch valve intervenes a flow path, or a fluid device with a flow path not provided with a device such as a valve, pump, or switch valve. Furthermore, it is needless to say that the claims should not be restrictively construed by the structure, numerical values, and so forth of the specific examples. The claims include technologies acquired by variously modifying, changing, or combining the above-described specific examples as appropriate by using known technology, knowledge of people skilled in the art, and so forth.

REFERENCE SIGNS LIST 1 electromagnetic valve (valve or fluid device)
1S seal part
10 flow path part
11 flow path
11A flow path on the inflow side
11B flow path on the outflow side
110 valve seat
141 first electrode
142 second electrode
15 bottom-closed hole
2 drive part
21 plunger
22 coil
25 valve body
27 slider
28 spool valve
3 control unit
31 drive circuit
32 detection circuit (circuit)
56 electrode
58 manifold (fluid device)

The invention claimed is:

1. A fluid device including a flow path where a liquid flows, the fluid device comprising:
   as electrodes for measuring a degree of electrical conductivity between the liquid in the flow path on an inflow upstream side and the liquid in the flow path on an outflow downstream side, a first electrode electrically in contact with the liquid on the upstream side and a second electrode electrically in contact with the liquid on the downstream side; and
   a circuit which measures the degree of electrical conductivity using the first electrode and the second electrode to detect an amount of the liquid flowing through the flow path or detect whether the liquid is present or absent, wherein
   the circuit includes
      a signal generation part which applies, between the first electrode and the second electrode, a voltage of an alternating square-wave in which a voltage of a positive value and a voltage of a negative value are cyclically and alternately switched,
      a signal processing part which acquires a measurement value indicating a magnitude of a current between the first electrode and the second electrode, and
      a determination part which determines the amount of the liquid flowing through the flow path or determines whether the liquid is present or absent,
   the signal processing part acquires a first measurement value as the measurement value at a point in time shifted by a predetermined time with reference to a first point in time when the voltage to be applied by the signal generation part is switched from a negative value to a positive value, and acquires a second measurement value as the measurement value at a time shifted by the predetermined time with reference to a second point in time when the voltage applied by the signal generation part is switched from a positive value to a negative value, and
   the circuit measures a magnitude of a differential value between the first measurement value and the second measurement value as an index indicating the degree of electrical conductivity.

2. The fluid device in claim 1, wherein the circuit includes a time measurement part which measures a shift time after the first or second point in time until the respective first or second measurement value acquired by the signal processing part reaches a maximum value or a minimum value in a state in which the liquid flows through the flow path, and sets the shift time as the predetermined time.

3. The fluid device in in claim 1, wherein the determination part is configured to perform a threshold process on the differential value to detect whether the liquid flowing through the flow path is present or absent, and
   the circuit includes a threshold setting part which sets a threshold value to be applied to the threshold process.

4. The fluid device in claim 2, wherein the determination part is configured to perform a threshold process on the differential value to detect whether the liquid flowing through the flow path is present or absent, and
   the circuit includes a threshold setting part which sets a threshold value to be applied to the threshold process.

5. The fluid device in claim 1, comprising a structure which is capable of setting a state in which a flow of the liquid is shut off and, the liquid on the upstream side and the liquid on the downstream side are electrically insulated in the state in which the flow of the liquid is shut off.

6. The fluid device in claim 2, comprising a structure which is capable of setting a state in which a flow of the liquid is shut off and, the liquid on the upstream side and the liquid on the downstream side are electrically insulated in the state in which the flow of the liquid is shut off.

7. The fluid device in claim 3, comprising a structure which is capable of setting a state in which a flow of the liquid is shut off and, the liquid on the upstream side and the liquid on the downstream side are electrically insulated in the state in which the flow of the liquid is shut off.

8. The fluid device in claim 1, wherein the fluid device is a valve in which a seal part for shutting of the flow of the liquid is provided midway of the flow path, and
   the first and second electrodes are electrodes for measuring the degree of electrical conductivity between the liquid on the upstream side and the liquid on the downstream side adjacent to each other across the seal part in the flow path.

9. The fluid device in claim 2, wherein the fluid device is a valve in which a seal part for shutting of the flow of the liquid is provided midway of the flow path, and
   the first and second electrodes are electrodes for measuring the degree of electrical conductivity between the liquid on the upstream side and the liquid on the downstream side adjacent to each other across the seal part in the flow path.

10. The fluid device in claim 3, wherein the fluid device is a valve in which a seal part for shutting of the flow of the liquid is provided midway of the flow path, and
    the first and second electrodes are electrodes for measuring the degree of electrical conductivity between the liquid on the upstream side and the liquid on the downstream side adjacent to each other across the seal part in the flow path.

11. The fluid device in claim 8, wherein the seal part includes a valve seat and a valve body, closes the valve by the valve body pressed onto the valve seat to shut off the flow of the liquid, and opens the valve by causing a gap between the valve seat and the valve body.

12. The fluid device in claim 11, including a movable member which is displaced with action of an electromagnetic force occurring in response to energization, and having a drive part which drives the valve body by displacement of the movable member and a flow path part made of non-conductive material with a hole forming the flow path and also with the valve seat formed thereto.

13. The fluid device in claim 12, wherein the drive part is a cylindrical coil with a wire wound therearound and having a columnar plunger as the movable member arranged and inserted therein, and is configured to drive the valve body by advancement and retreat of the plunger in an axial direction.

\* \* \* \* \*